US008335718B2

(12) United States Patent
Feldman et al.

(10) Patent No.: US 8,335,718 B2
(45) Date of Patent: Dec. 18, 2012

(54) CONTENT ITEM SLOT SCHEDULING

(75) Inventors: Jon Feldman, New York, NY (US);
Shanmugavelayutham Muthukrishnan, New York, NY (US);
Martin Pal, Metuchen, NJ (US);
Evdokia V. Nikolova, Cambridge, MA (US)

(73) Assignee: Google Inc., Mountain View, CA (US)

( * ) Notice: Subject to any disclaimer, the term of this patent is extended or adjusted under 35 U.S.C. 154(b) by 920 days.

(21) Appl. No.: 12/197,726

(22) Filed: Aug. 25, 2008

(65) Prior Publication Data

US 2010/0049644 A1   Feb. 25, 2010

(51) Int. Cl.
*G06Q 30/00* (2012.01)

(52) U.S. Cl. ............... 705/14.48; 705/14.61; 705/14.68; 705/14.69

(58) Field of Classification Search ............... 705/14.48, 705/14.42, 14.4, 14.41, 14.61, 14.68, 14.69, 705/14.71
See application file for complete search history.

(56) References Cited

U.S. PATENT DOCUMENTS

| 6,009,409 A * | 12/1999 | Adler et al. ................. 705/14.61 |
| 6,253,189 B1 * | 6/2001 | Feezell et al. ............... 705/14.61 |
| 6,714,975 B1 * | 3/2004 | Aggarwal et al. ............. 709/224 |
| 6,990,462 B1 * | 1/2006 | Wilcox et al. ............... 705/14.61 |
| 7,035,812 B2 * | 4/2006 | Meisel et al. ............... 705/14.54 |
| 2003/0149622 A1 * | 8/2003 | Singh et al. ..................... 705/14 |
| 2003/0158806 A1 * | 8/2003 | Hanley et al. ................... 705/37 |
| 2006/0095281 A1 * | 5/2006 | Chickering et al. ............... 705/1 |
| 2006/0277135 A1 * | 12/2006 | Jain et al. ........................ 705/37 |
| 2007/0038509 A1 * | 2/2007 | Jain et al. ........................ 705/14 |
| 2007/0073583 A1 * | 3/2007 | Grouf et al. ..................... 705/14 |
| 2007/0168254 A1 * | 7/2007 | Steelberg et al. ................ 705/14 |
| 2008/0027803 A1 * | 1/2008 | Mendelevitch et al. ......... 705/14 |
| 2008/0059298 A1 * | 3/2008 | Waag et al. ..................... 705/14 |
| 2008/0275775 A1 * | 11/2008 | Gonen et al. ................... 705/14 |
| 2009/0070211 A1 * | 3/2009 | Gonen ............................ 705/14 |
| 2009/0099902 A1 * | 4/2009 | Chatter et al. .................. 705/10 |

OTHER PUBLICATIONS

Feldman, J. *A Truthful Mechanism for Offline Ad Slot Scheduling* [online] [retrieved on Aug. 13, 2008] retrieved from http://arXiv.org/abs/0801.2931 (submitted on Jan. 18, 2008).

* cited by examiner

*Primary Examiner* — John Weiss
*Assistant Examiner* — Krishan Mittal
(74) *Attorney, Agent, or Firm* — Fish & Richardson P.C.

(57) ABSTRACT

Content item presentation slots (e.g., advertisement slots) can be grouped into a slot group so that more than one presenter (e.g., advertiser) can share a corresponding number of slots on the publisher's property over a defined time period. The presenters can be scheduled to the slots within the slot group to maximize a performance measurement (e.g., number of clicks) that each presenter realizes according to budget constraints that are defined by the presenters.

20 Claims, 8 Drawing Sheets

CONTENT ITEM SLOT SCHEDULING

BACKGROUND

This document relates to information presentation.

The Internet allows access to a wide variety of content items, e.g., video and/or audio files, web pages for particular subjects, news articles, etc. Such access to these content items has enabled opportunities for targeted advertising. For example, content items of particular interest to a user can be identified by a search engine in response to a user query. The query can include one or more search terms, and the search engine can identify and, optionally, rank the content items based on the search terms in the query and present the content items to the user (e.g., according to the rank). This query can also be an indicator of the type of information of interest to the user. By comparing the user query to a list of keywords specified by an advertiser, it is possible to provide targeted advertisements to the user.

Another form of online advertising is advertisement syndication, which allows advertisers to extend their marketing reach by distributing advertisements to additional partners. For example, third party online publishers can place an advertiser's text or image advertisements on web pages that have content related to the advertisement. As the users are likely interested in the particular content on the publisher webpage, they are also more likely to be interested in the product or service featured in the advertisement. Accordingly, such targeted advertisement placement can help drive online customers to the advertiser's website.

In some situations, scheduling can be performed that allocates portions of publishers' web properties to advertisers for defined time periods. However, efficiently allocating publishers' properties on a predefined schedule is not a trivial task.

SUMMARY

In some aspects, content item slot scheduling is described including scheduling publishers' advertisement slots to specific advertisers. The slots can be grouped into a slot group so that more than one advertiser can share a corresponding number of advertisement slots on the publisher's property. The advertisers can be scheduled to the slots within the slot group to maximize a performance measurement (e.g., number of clicks) that each advertiser realizes according to budget constraints that are defined by the advertisers.

In general, one aspect of the subject matter described in this specification can be embodied in a method of scheduling content items. The method of scheduling content items can include the actions of receiving budget constraints from bidders, wherein each budget constraint defines a maximum budget that each bidder allocates for a defined time period; allocating each bidder to one of a plurality of slots based on the budget constraints; grouping the plurality of slots into one or more slot groups, wherein at least two of the plurality of slots are considered to define at least one slot group; determining a price for each slot group based on the budget constraints that correspond to the bidders in the slot group and a slot performance associated with the slots in the slot group; and scheduling the bidders to the slots in the slot groups during the defined time period based on the price. Other embodiments of this aspect include corresponding systems, apparatus, and computer program products.

These and other implementations can optionally include one or more of the following features. The step of allocating each bidder to one of a plurality of slots can include ordering the bidders based on the corresponding budget constraints; ordering the slots based on the slot performance; and allocating the bidders to slots in descending order. Additionally, the step of grouping the plurality of slots into one or more slot groups can include determining a plurality of group ratios; and grouping one or more slots into a slot group based on the group ratios. Further, the step of scheduling the bidders to the slots in the slot groups can include determining a portion of the slot performance associated with the slot group that each bidder can receive without exceeding the corresponding budget constraint; and scheduling the bidders to the slots of the slot group for a portion of the time period based on the determined portion of the slot performance that each bidder can receive.

Particular embodiments of the subject matter described in this specification can be implemented so as to realize one or more of the following advantages. The advertisement performance realized by advertisers can be increased. Multiple advertisement slots can be combined to facilitate scheduling. Further, cost constraints, such as budget constraints and cost per click constraints, and performance constraints, such as not placing an advertiser in two slots at any one time, can be satisfied while increasing advertisement performance. These advantages can be separately realized or realized in combination in various implementations.

These various optional advantages and features can be separately realized and need not be present in any particular embodiment. The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
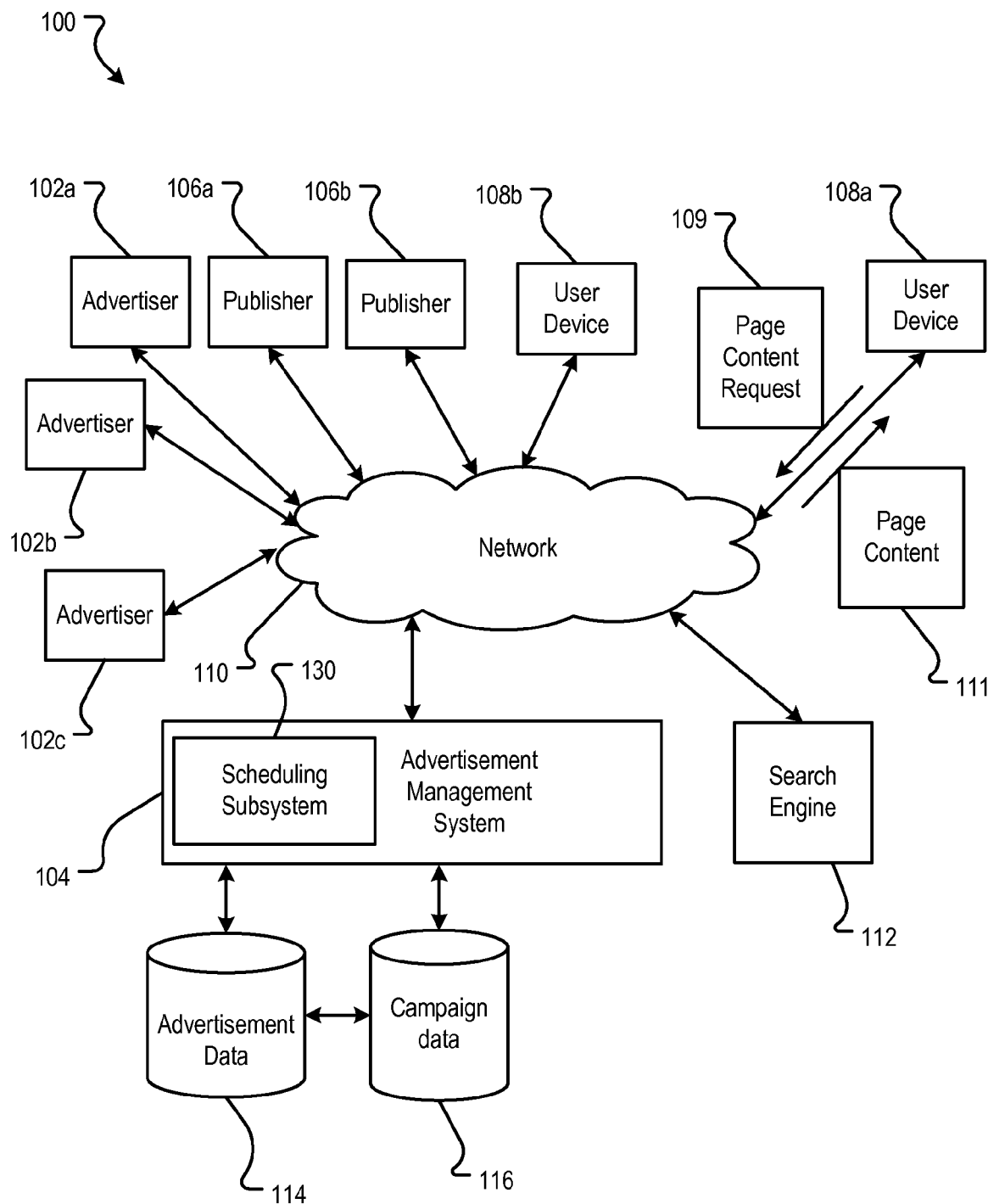
FIG. 1 is a block diagram of an example online environment.

FIG. 1 is a block diagram of an example online environment 100. The online environment 100 can facilitate the identification and serving of content items, e.g., web pages, advertisements, etc., to users. A computer network 110, such as a local area network (LAN), wide area network (WAN), the Internet, or a combination thereof, connects advertisers 102a and 102b, an advertisement management system 104, publishers 106a and 106b, user devices 108a and 108b, and a search engine 112. Although only three advertisers (102a, 102b, and 102c), two publishers (106a and 106b) and two user devices (108a and 108b) are shown, the online environment 100 may include many thousands of advertisers, publishers and user devices. Although reference is made to an online environment, such as delivery of content by way of the Internet, the proposed methods for content slot scheduling can be applied to other forms of media including, for example, other forms of broadcast, multicast, print, radio, or television media.

§1.0 Advertisement Publishing And Tracking

In some implementations, one or more advertisers 102a, 102b and/or 102c can directly, or indirectly, enter, maintain, and track advertisement information in the advertising management system 104. The advertisements can be in the form of graphical advertisements, such as banner advertisements, text only advertisements, image advertisements, audio advertisements, video advertisements, advertisements combining one of more of any of such components, etc., or any other type of electronic advertisement document. The advertisements may also include embedded information, such as links, meta-information, and/or machine executable instructions, such as HTML or JavaScript™.

A user device, such as user device 108a, can submit a page content request 109 to a publisher or the search engine 112. In some implementations, the page content 111 can be provided to the user device 108a in response to the request 109. The page content can include advertisements provided by the advertisement management system 104, or can include executable instructions, e.g., JavaScript™, that can be executed at the user device 108a to request advertisements from the advertisement management system 104. Example user devices 108 include personal computers, mobile communication devices, television set-top boxes, etc.

Advertisement requests can also be received from the publishers 106. For example, one or more publishers 106a and/or 106b can submit advertisement requests for one or more advertisements to the system 104. The system 104 responds by sending the advertisements to the requesting publisher 106a or 106b for placement on one or more of the publisher's web properties (e.g., websites and other network-distributed content). The advertisements can include embedding links landing pages, e.g., pages on the advertisers' 102 websites, that a user is directed to when the user clicks an ad presented on a publisher website. The advertisement requests can also include content request information. This information can include the content itself (e.g., page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, a publisher 106 can combine the requested content with one or more of the advertisements provided by the system 104. This combined requested content and advertisements can be sent to the user device 108 that requested the content (e.g., user device 108a) as page content 111 for presentation in a viewer (e.g., a browser or other content display system). The publisher 106 can transmit information about the advertisements back to the advertisement management system 104, including information describing how, when, and/or where the advertisements are to be rendered (e.g., in HTML or JavaScript™).

Publishers 106a and 106b can include general content servers that receive requests for content (e.g., articles, discussion threads, music, video, graphics, search results, web page listings, information feeds, etc.), and retrieve the requested content in response to the request. For example, content servers related news content providers, retailers, independent blogs, social network sites, or any other entity that provides content over the network 110 can be a publisher.

Advertisements can also be provided through the use of the search engine 112. The search engine 112 can receive queries for search results. In response, the search engine 112 can retrieve relevant search results from an index of documents (e.g., from an index of web pages). An exemplary search engine 112 is described in the article S. Brin and L. Page, "The Anatomy of a Large-Scale Hypertextual Search Engine," Seventh International World Wide Web Conference, Brisbane, Australia and in U.S. Pat. No. 6,285,999. Search results can include, for example, lists of web page titles, snippets of text extracted from those web pages, and hypertext links to those web pages, and may be grouped into a predetermined number of (e.g., ten) search results.

The search engine 112 can also submit a request for advertisements to the system 104. The request may include a number of advertisements desired. This number may depend on the search results, the amount of screen or page space occupied by the search results, the size and shape of the advertisements, etc. The request for advertisements may also include the query (as entered or parsed), information based on the query (such as geo-location information, whether the query came from an affiliate and an identifier of such an affiliate), and/or information associated with, or based on, the search results. Such information may include, for example, identifiers related to the search results (e.g., document identifiers or "dociDs"), scores related to the search results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores, etc.

The search engine 112 can combine the search results with one or more of the advertisements provided by the system 104. This combined information can then be forwarded to the user device 108 that requested the content as the page content 111. The search results can be maintained as distinct from the advertisements, so as not to confuse the user between paid advertisements and presumably neutral search results.

The advertisers 102, user devices 108, and/or the search engine 112 can also provide usage information to the advertisement management system 104. This usage information can include measured or observed user behavior related to advertisements that have been served, such as, for example, whether or not a conversion or a selection related to an advertisement has occurred. The system 104 performs financial transactions, such as crediting the publishers 106 and charging the advertisers 102 based on the usage information. Such usage information can also be processed to measure performance metrics, such as a click-through-rate ("CTR"), conversion rate, etc.

A click-through can occur, for example, when a user of a user device, selects or "clicks" on a link to a content item returned by the publisher or the advertising management system. The CTR is a performance metric that is obtained by dividing the number of users that clicked on the content item, e.g., a link to a landing page, an advertisement, or a search result, by the number of times the content item was delivered. For example, if a link to a content item is delivered 100 times, and three persons click on the content item, then the CTR for that content item is 3%. Other usage information and/or performance metrics can also be used.

A "conversion" occurs when a user consummates a transaction related to a previously served advertisement. What constitutes a conversion may vary from case to case and can be determined in a variety of ways. For example, a conversion may occur when a user clicks on an advertisement, is referred to the advertiser's web page, and consummates a purchase there before leaving that web page. A conversion can also be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, etc. Other actions that constitute a conversion can also be used.

§2.0 Slot Scheduling

In addition to the advertisements being selected based on content, such as in response to a search query or web page content of a publisher, advertisers 102 can be assigned to an advertisement slot (e.g., on a publisher's property) for a defined time period. During the defined time period the advertiser's advertisements can be presented in the advertisement slot. This time based slot assignment is referred to as slot scheduling. Slots can be allocated, for example, to maximize particular performance measurements associated with the advertisements that are presented, for example, on the page. In some implementations, the number of clicks that are received by the advertisers can be maximized. In some implementations, an advertiser's clicks can be maximized while adhering to cost constraints that have been imposed by the advertiser, as discussed below. In some implementations, two types of cost constraints are considered. The first is a bid constraint and the second is a budget constraint.

§2.1 Cost Constraints

In some implementations, advertisers 102 may be permitted to select, or bid, an amount the advertisers are willing to pay for each interaction (e.g., click of) with an advertisement, e.g., a cost-per-click amount an advertiser pays when, for example, a user clicks on an advertisement that is presented in the slot that is allocated to the advertiser. The cost-per-click can include a maximum cost-per-click, e.g., the maximum amount the advertiser is willing to pay for each click of advertisement based on a keyword. For example, advertisers A, B, and C all select, or bid, a maximum cost-per-click of $0.50, $0.75, and $1.00, respectively. The maximum amount advertiser A will pay for a click is $0.50, the maximum amount advertiser B will pay is $0.75, and the maximum amount advertiser C will pay is $1.00. The bids that are received from the advertisers can be used by the advertisement management system 104 to perform different types of auctions to select advertisements.

Advertisers 102 may also be permitted to select or specify a budget that is associated with an advertisement or group of advertisements. The budget can be the maximum amount that the advertiser 102 is willing to pay for presentation of advertisements during a defined time period. Continuing with the above example, advertisers A, B, and C can each select or specify a daily budget of $50, $75, and $200, respectively. The maximum amount that advertiser A will pay for clicks each day is $50, the maximum amount that advertiser B will pay each day is $75, and the maximum amount that advertiser C will pay each day is $200. An advertiser can set a budget for a single advertisement or for a group of advertisements.

The budgets that are received from the advertisers 102 can be used by the advertisement management system 104 to determine which advertisements are available for the auction. Generally, advertisements that are associated with budgets that have not been fully spent are eligible to participate in the auction. When multiple advertisements are associated with the same budget, none of the advertisements is eligible to participate in the auction once the budget has been spent.

§2.2 Example Scheduling Environment

Figure 2:
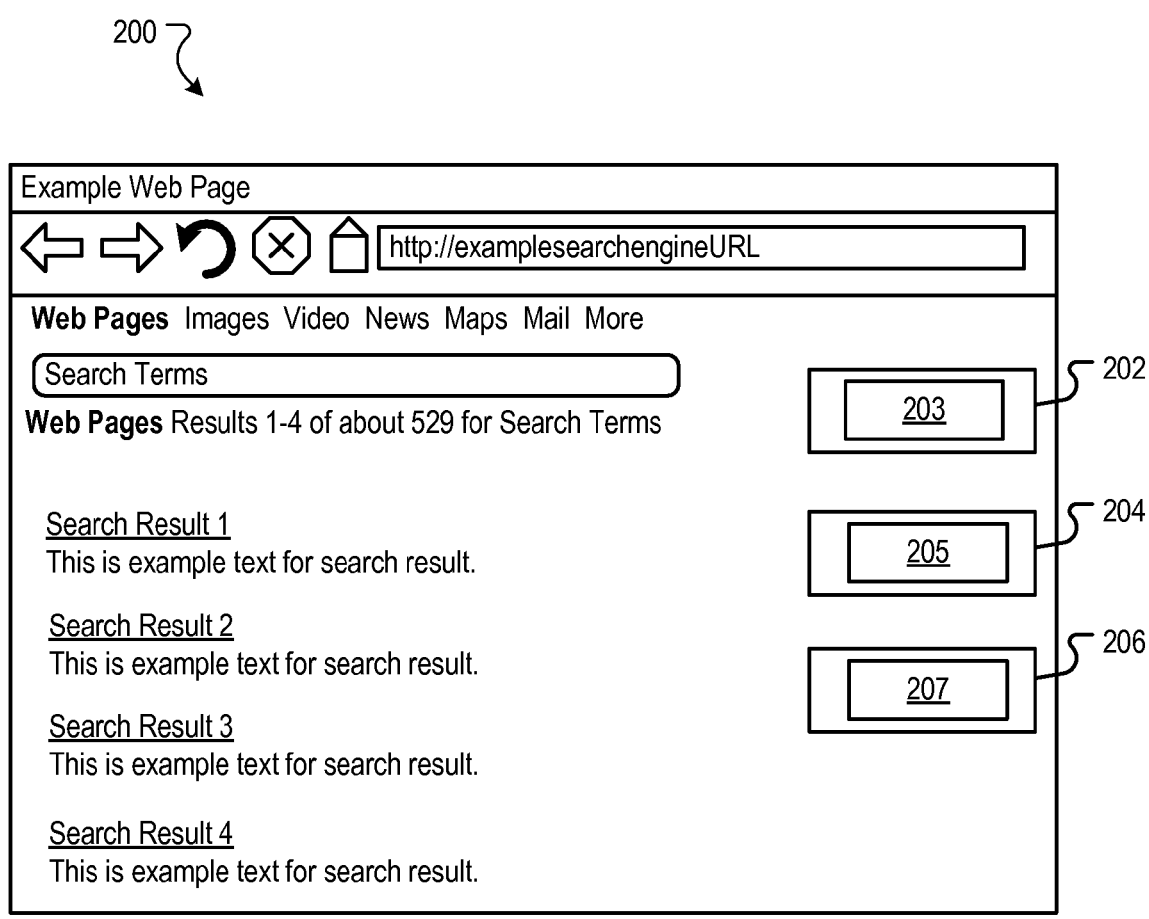
FIG. 2 is an example web page in which slot scheduling can be performed.

FIG. 2 is an example web page 200 in which slot scheduling can be performed. The web page 200 includes advertisement slots 202, 204, and 206, in which advertisements 203, 205, and 207 are displayed. In some implementations, bidders are allocated to a slot group for a defined time period. For example, advertiser 102a and advertiser 102b can be grouped together in a slot group that includes slots 202 and 204. In turn, advertisers 102a and 102b can be scheduled to share the slots 202 and 204 that define the slot group. Similarly, advertisers 102a, 102b, and 102c can be grouped together in a slot group that includes the three slots 202, 204, and 206. Allocating multiple advertisers to slot groups allows the advertisers to share multiple slots within the slot group throughout the defined time period.

In some implementations, slot scheduling can be performed by a scheduling subsystem 130. The scheduling subsystem 130 can schedule slots to bidders based on, for example, one or more cost constraints. In some implementations, slot scheduling can be based on an advertiser's budget, without considering the advertiser's bid. In some implementations, slot scheduling can be based on an advertiser's budget and a maximum cost per click the advertiser is willing to pay. These example implementations are discussed below.

§2.3 Budgets Only Scheduling

Figure 3:
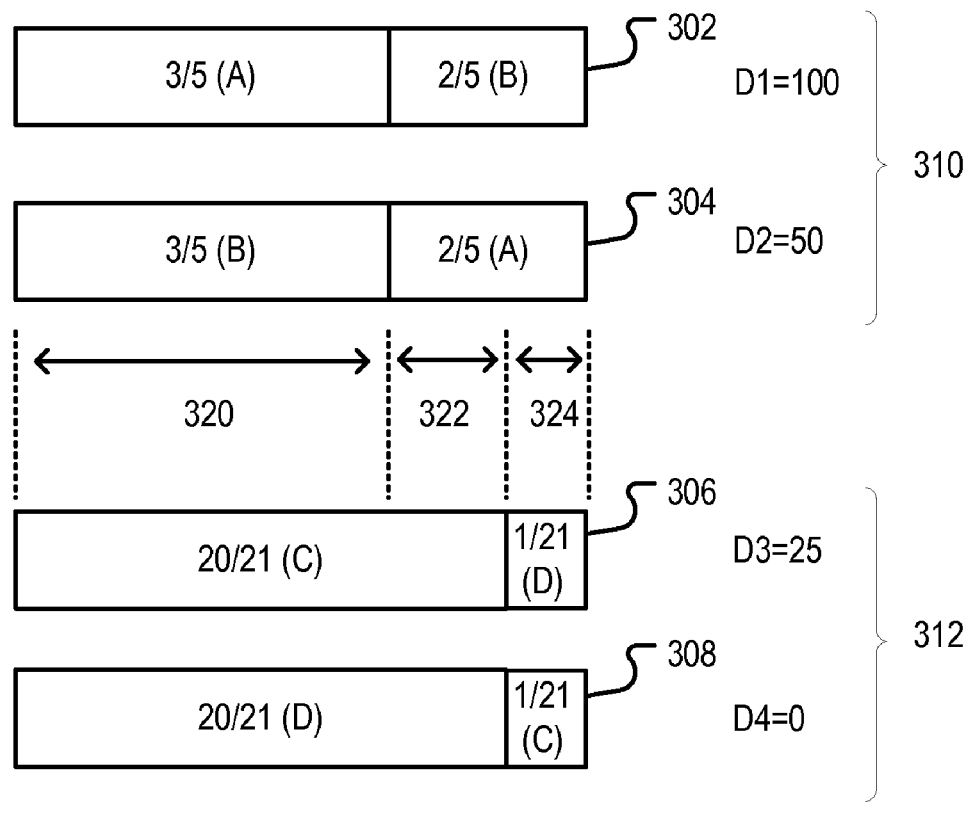
FIG. 3 is a block diagram of an example slot schedule based on budgets.

In some implementations, the scheduling subsystem 130 can schedule advertisers 102 to slots based only on the budgets associated with the advertisers 102. FIG. 3 is a block diagram of an example slot schedule 300 based on budgets alone. The example slot schedule 300 includes three advertisement slots 302, 304, and 306 that are available for allocation over a defined time period T. If there are more advertisers 102 than slots, a dummy slot 308 can be used as a placeholder for advertisers that are allocated to a slot during the defined time period, but are not currently allocated to the available slots 302, 304, 306.

Each of the slots 302, 304, and 306 can have a performance measure associated with it. In some implementations, the slots 302, 304, and 306 can be associated with a click performance (e.g., an average total number of clicks during a defined time period). For example, the slots 302, 304, and 306 can be associated with click performances D1-D3 over time period T of 100 clicks, 50 clicks, and 25 clicks, respectively. The performance measure can be derived from a historical performance of the slots. For example, an average historical click performance can be determined for each slot. The dummy slot 308 is associated with a click performance D4 of 0 clicks because it is not a slot that appears on the web page and therefore advertisers will not receive any clicks while allocated to the dummy slot 308.

The scheduling subsystem 130 can allocate the advertisers to the slots so that, for example, the total number of clicks is maximized using the click performances associated with the slots 302, 304, and 306 and the budgets received from the advertisers. As discussed above, the scheduling subsystem 130 can consider grouping multiple advertisers together to share multiple advertisement slots. The optimal allocation can be determined by identifying advertisers and slots to group into a slot group and identifying the price for each group that optimizes the allocation to maximize, for example, the clicks received by the advertisers.

For example, advertisers A, B, C, and D can submit the budgets of $80, $70, $20, and $1, respectively for allocation to advertisement slots 302, 304, and 306 having click performances of 100 clicks, 50 clicks, and 25 clicks, respectively. The scheduling subsystem 130 can initially allocate the advertisers 102 to an individual slot in descending order according to budgets, as shown in Table 1:

TABLE 1

| Advertiser | Budget (Bi) | Slot | Click Performance (Di) |
|---|---|---|---|
| A | $80 | 302 | 100 |
| B | $70 | 304 | 50 |
| C | $20 | 306 | 25 |
| D | $1 | Dummy Slot | 0 |

The scheduling subsystem 130 can use this initial allocation to determine which slots can be grouped to optimize the total number of clicks. In some implementations, the scheduling subsystem 130 can identify optimal slot groups based on group ratios. A group ratio can be defined as the ratio of the total budget of the advertisers in the group relative to the total click performance of the slots in the group (e.g., Bi+ . . . +Bn/Di+ . . . +Dn). The scheduling subsystem 130 can determine a group ratio for each possible slot group and select the possible slot group having the highest group ratio as an optimal grouping. In some implementations, the possible slot groups are restricted to groups of slots that include a candidate slot and all of the higher performing slots that are not already part of a slot group.

For example, the first slot group for slots 302, 304, and 306 can be identified by determining a group ratio for possible slot groups that include each slot 302, 304, and 306 and all slots that are associated with higher click performance. The first possible slot group can include slot 302 by itself because there are no slots that are associated with a higher click performance (e.g., 100). The second possible slot group can include slot 304 and slot 302 because slot 302 has a higher click performance that slot 304. Similarly, the third possible slot group can include slots 306, 304, and 302. Finally, the fourth possible slot group can include the dummy slot 308 and slots 306, 304, and 302. The group ratio for each of the possible slot groups can be determined and are presented in Table 2:

TABLE 2

| Group | Group Budget (Bi + . . . + Bn) | Slot(s) | Group Clicks (Di + . . . + Dn) | Group Ratio (Bi + . . . Bn)/Di + . . . Dn) |
|---|---|---|---|---|
| 1 | $80 | 302 | 100 | 80/100 |
| 2 | $70 + $80 | 304, 302 | 50 + 100 | 150/150 |
| 3 | $20 + $70 + $80 | 306, 304, 302 | 25 + 50 + 100 | 170/175 |
| 4 | $1 + $20 + $70 + $80 | 308, 306, 304, 302 | 0 + 25 + 50 + 100 | 171/175 |

As presented in Table 2, possible slot group 2 that includes slots 302 and 304 has the highest group ratio at 150/150. Therefore, the scheduling subsystem 130 can define the first slot group to include slots 302 and 304.

To find the next group, the scheduling subsystem 130 can repeat the routine described above for slot 306 and the dummy slot 308. The first possible group will include slot 306 alone because there are no slots having a higher click performance than slot 306 that are not already assigned to a group. The corresponding group ratio for slot 306 alone is 20/25. The second possible group will include the dummy slot 308 and slot 306. The group ratio corresponding to this possible group is 21/25. Thus, the scheduling subsystem 130 can create a second slot group that includes the dummy slot 308 and slot 306 together. The final slot groups after the analysis performed above include slot group 310 that includes slots 302 and 304 and slot group 312 that includes slot 306 and dummy slot 308, as illustrated in FIG. 3.

Advertisers that are associated with slots that define the slot group are also grouped and associated with the respective slot group. The advertisers that are associated with each group will share the slots that define the group in proportion so that each advertiser will spend its entire budget for time period T while receiving the maximum number of clicks possible.

In some implementations, a price-per-click that each advertiser in a group will pay can be set equal to the group ratio for the group. For example, advertiser A and advertiser B that were originally associated with slots 302 and 304 are grouped together in slot group 310. Accordingly, advertiser A and advertiser B will share slots 302 and 304. The price that advertiser A and advertiser B will pay for each click received in either of slots 302 and 304 can be set equal to $1/click (e.g., the group ratio $150/150 clicks). Similarly, the price-per-click for advertiser C and advertiser D in slot group 312 can be set equal to $21/25 clicks.

Once the price-per-click that the advertisers in a group will pay is set, the scheduling subsystem 130 can assign the advertisers to the slots so that the advertisers' budgets will be spent over time period T, while maximizing, for example, the clicks received by the advertisers. For example, the scheduling subsystem 130 can schedule advertiser A and advertiser B to slot 302 and slot 304 based on the advertisers corresponding budgets, the click performance of slot 302 and slot 304, and the price-per-click assigned to the slot group.

In some implementations, this slot scheduling can be performed based on the outcome of a machine scheduling routine (e.g., $Q|pmtn|C_{max}$). Continuing with the above example, the scheduling subsystem 130 can determine the optimum allocation of advertiser A and advertiser B in group 310 results from scheduling advertiser A to slot 302 3/5 of the time period T and to slot 304 2/5 of the time period T. In turn, the scheduling subsystem 130 can assign advertiser B to slot 304 3/5 of the time period T and to slot 302 2/5 of the time period T.

This example allocation of slots 302 and 304 can be determined by identifying the proportion of time that advertiser A and advertiser B can be assigned to slots 302 and 304 such that each advertiser's budget is fully spent over the time period T. In this example, advertiser A has a budget of $80 and advertiser B has a budget of $70 for time period T. Thus, advertiser A will be allocated to slots 302 and 304 such that advertiser A's budget of $80 is fully spent over time period T. Similarly, advertiser B will be allocated to slots 302 and 304 such that advertiser B's budget is fully spent over time period T.

In some implementations, advertisers A and B can be allocated to slots 302 and 304, respectively, for a fraction X of the time period T. In turn, the advertisers A and B will be allocated to slots 304 and 302, respectively for the remainder of the time period T (e.g., 1-X). Thus, advertiser A receive a fraction X of the clicks available from slot 302 and a fraction X-1 of the clicks available from slot 304. Similarly, advertiser B will receive a fraction X of the clicks available from slot 304 and a fraction X-1 of the clicks available from slot 302. This allocation of advertiser A and advertiser B to slots 302 and 304 results in the advertisers' respective budgets being fully spent on the full click performances of the slots over the time period T. The allocation relationship can be expressed according to equations 1 and 2.

$$X*100+(1-X)*50=80 \quad (1)$$

$$X*50+(1-X)*100=70 \quad (2)$$

Solving either equation 1 or equation 2 for X results in a fraction X that equals 3/5 and a fraction (1-X) that equals 2/5. Thus, the allocation provided above is obtained. Assigning the advertisers to the slots in proportion, as described, ensures that at any given time each advertiser is assigned to at most one slot. Similarly, assigning the advertisers in proportion ensures that not more than one advertiser is assigned to any given slot at any given time.

Similarly, the scheduling subsystem 134 can determine that the optimum allocation of advertiser C and advertiser D in group 312 results from scheduling advertiser C to slot 306 20/21 of the time period T and to the dummy slot 308 1/21 of time period T. The scheduling subsystem 130 can schedule advertiser D in slot 306 the remaining 1/21 of time period T, while scheduling advertiser D in the dummy slot 308 the remaining 20/21 of the time period T. Scheduling advertisers to the slots in slot groups 310 and 312 in this manner results in a high likelihood that each advertiser's budget is fully spent by the end of the time period T. Additionally, this allocation facilitates the maximum click realization by the advertisers because the full click performance associated with each slot is fully realized.

In some implementations, the scheduling subsystem 130 can schedule the advertisers by splitting the time period T into allocation blocks. The allocation blocks can correspond, for example, to the portion of time that each advertiser is scheduled to appear in each slot. Continuing with the example above, the scheduling subsystem 130 can allocate advertisers A, B, C and D to slots 302, 304, 306 and 308, respectively for a first portion 320 (e.g., 3/5) of the time period T. During a second portion 322 (e.g., 2/5-1/21) of the time period T, the scheduling subsystem 130 can allocate advertisers B, A, C and D to slots 302, 304, 306 and 308, respectively. Finally, during a third portion 324 (e.g., 1/21) of the time period T, the scheduling subsystem 130 can allocate advertisers B, A, D and C to slots 302, 304, 306 and 308, respectively In some implementations, the scheduling can be performed by allocating the advertisers to the slots based on a virtual coin flip, where the "coin" can have a number of sides that corresponds to the number of different allocations that are realized during the time period. Each side of the coin can have a probability of occurrence that corresponds to the fraction of the time period that the portion represents. For example, in the above example, a three-sided coin can be simulated having a first side that corresponds to the first portion 320 of the time period T. Therefore, a flip that lands on the first side of the coin can result in an allocation of advertisers A, B, C and D to slots 302, 304, 306 and 308, respectively. The first side of the coin will have a probability of occurrence that is equal to 3/5 because allocation of the first portion 320 is scheduled to occur 3/5 of the time period T.

The second side of the coin can correspond to the second portion 322 of the time period T. Therefore, a flip that lands on the second side of the coin can result in an allocation of advertisers B, A, C and D to slots 302, 304, 306 and 308, respectively. The second side of the coin will have a probability of occurrence that is equal to 2/5-1/21, because the allocation of the second portion 322 is scheduled to occur 2/5-1/21 of the time period T. Finally, in this example, the third side of the coin can correspond to the third portion 324 of the time period T. Therefore, a flip that lands on the third side of the coin can result in an allocation of advertisers B, A, D and C to slots 302, 304, 306 and 308, respectively. The third side of the coin will have a probability of occurrence that is equal to 1/21 because the allocation of the third portion 324 is scheduled to occur 1/21 of the time period T. Scheduling the advertisers according to virtual coin flip allows the advertisers to share the slots throughout the time period T, rather than allocating continuous portions of the time period T to the advertisers.

§2.4 Scheduling Based on Bids and Budgets

Figure 4:
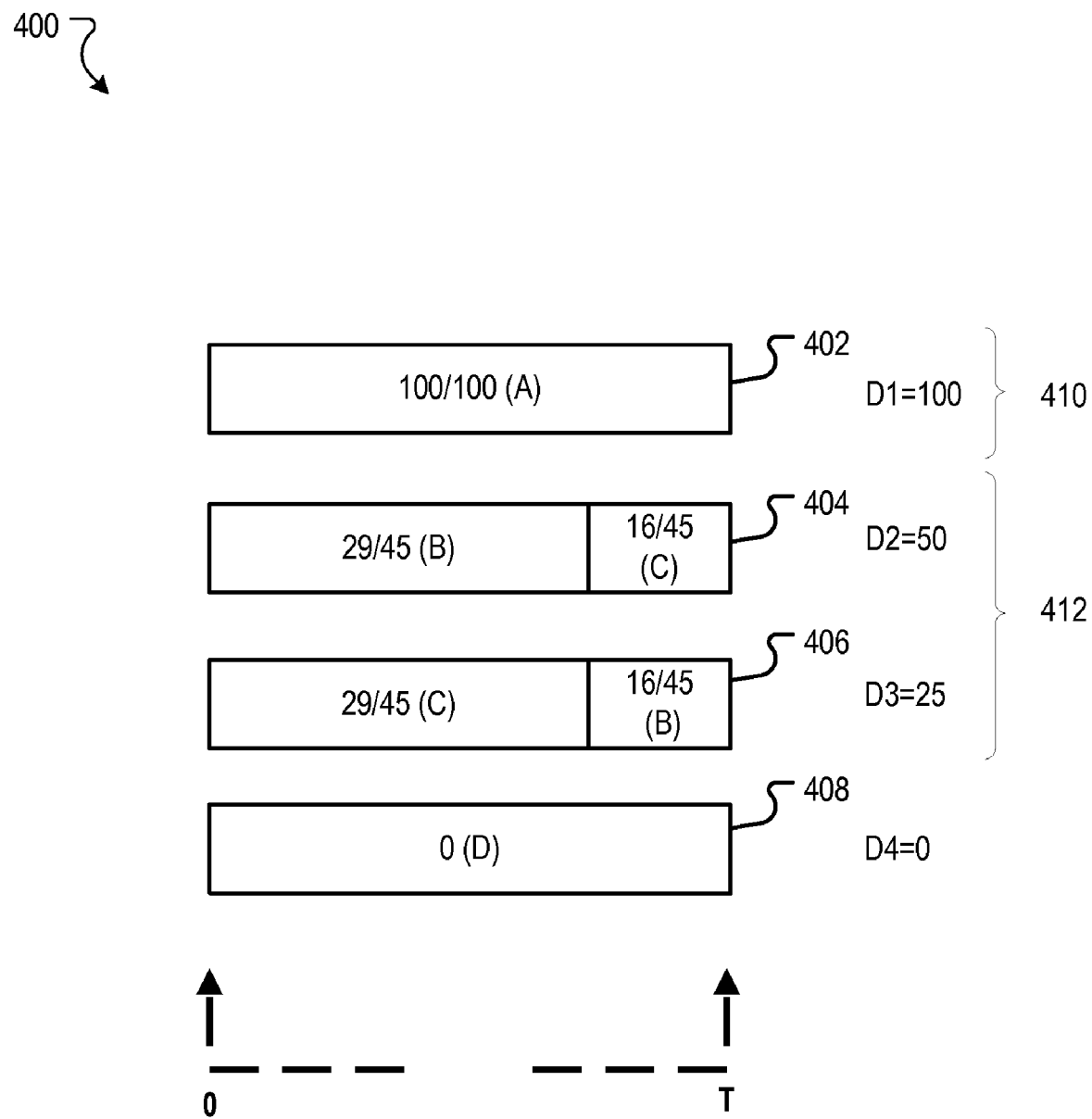
FIG. 4 is a block diagram of an example slot schedule based on budgets and bids.

In some implementations, the scheduling subsystem 130 can schedule advertisers 102 to slots based only on the budgets and bid associated with the advertisers 102. FIG. 4 is a block diagram of an example slot schedule 400 based on budgets and bids. The example slot schedule 400 includes three advertisement slots 402, 404, and 406 that are available for allocation over a defined time period T. If there are more advertisers 102 than slots, a dummy slot 408 can be used as a placeholder as described above.

Each of the slots 402, 404, and 406 can be, for example, associated with click performances of D1-D3 over time period T of 100 clicks, 50 clicks, and 25 clicks, respectively. The dummy slot 408 is again associated with a click performance D4 of 0 clicks. As discussed above, the scheduling subsystem 130 can consider grouping multiple advertisers together in slot groups. When budgets and bids are being used to identify the optimal allocation of advertisers to slots, the scheduling subsystem 130 can use the bids as a constraint in identifying the slot groups as well as the price-per-click that is assigned to each group.

The scheduling subsystem 130 can receive budgets from advertisers A, B, C, and D that equal $80, $70, $20, and $1, respectively for allocation to advertisement slots 402, 404, and 406 having click performances of 100 clicks, 50 clicks, and 25 clicks, respectively. In addition to budgets, the scheduling subsystem 130 can also receive price-per-click bids equal to $3, $0.75, $1, and $0.50, respectively. The scheduling subsystem 130 can initially allocate the advertisers 102 to an individual slot in descending order according to budgets, as shown in Table 3:

TABLE 3

| Advertiser | Budget (Bi) | Bid (bi) | Slot | Click Performance (Di) |
|---|---|---|---|---|
| A | $80 | $3 | 402 | 100 |
| B | $70 | $.75 | 404 | 50 |
| C | $20 | $1 | 406 | 25 |
| D | $1 | $.50 | Dummy Slot | 0 |

The scheduling subsystem 130 can use this initial allocation to determine which slots can be grouped to optimize the total number clicks with the bids operating as constraints.

Similar to the budgets only scenario, the scheduling subsystem 130 can determine slot groups according to the group ratios of the possible slot groups (e.g., Bi+ . . . +Bn/Di+ . . . +Dn). However, when the advertisers have submitted both budgets and bids, the possible groups are additionally considered according to the bids associated with the advertisers.

In some implementations, the advertisers can be considered for inclusion in slot groups in descending order of the advertisers' bids rather than descending budget. For example, the first possible slot group can include slot 402 because advertiser A is associated with the highest bid among the advertisers. The next possible slot group can include slot 402 and slot 404 being occupied by advertiser A and advertiser C, the advertisers who have submitted the two highest bids, rather than advertiser A and advertiser B, who submitted the two highest budgets. The remaining advertisers can also be considered for slot groups in descending order of bids. In other words, advertisers having higher bids are considered for placement in a slot group before advertisers having lower bids.

In some implementations, the first slot group can be determined by identifying the possible group that has a group ratio that meets or exceeds a next highest bid (e.g., $r_x \geq b_{k+1}$). For example, beginning with first possible group that includes slot 402 (e.g., associated with the highest bid), the group ratio (e.g., Bi/Di) for the first possible group is $80/100=$0.80. Here, this group ratio does not meet or exceed the next highest bid of $1.00 that is associated with advertiser C. Therefore, a second possible group that includes slot 402 and slot 404 being occupied by advertiser A and advertiser C can be considered.

The group ratio associated with the second possible group is 0.667 (e.g., B1+B3/D1+D2=$80+$20/100+50). This group ratio is lower than the group ratio of the first possible group. Therefore, the maximum group ratio associated with the first possible group and second possible group is still equal to $0.80 (e.g., max of 0.667 and 0.80). However, this group ratio of the first possible group now exceeds the next highest bid (e.g., $0.75 for advertiser B).

When the maximum group ratio meets or exceeds the next highest bid, no more bidders are considered and the slot group is defined. Therefore, slot group 410 can be defined including slot 402 allocated to advertiser A alone as this group has the highest group ratio of $0.80. As in the budgets only case, the group ratio can be assigned as the price-per-click for each click received in the slot group. Accordingly, each click received by advertiser A in slot group 410 will cost $0.80.

Once slot group 410, containing slot 402 has been defined, a slot group 412 can be defined in a similar manner. Continuing with the example above, the group ratio associated with advertiser C (e.g., the next highest bidder) occupying slot 404 is $0.40 (e.g., B3/D2=$20/50). Since $0.40 is less than the next lowest bid of $0.75 (e.g., b3), then a possible slot group that includes advertiser B and advertiser C and slots 404 and 406 can be considered. The maximum group ratio for the possible slot group including slots 404 and 406 is $70/50=$1.40 (e.g., max {B2/D2, B2+B3/D2+D3}). This group ratio is higher than the next highest bid price (e.g., $0.50) that is associated with advertiser D. Accordingly, slot 404 and slot 406 can be grouped together as slot group 412, and shared by advertiser B and advertiser C over time period T with a price-per-click of $1.40.

However, $1.40 also exceeds the maximum bid for advertiser B. Therefore, advertiser B cannot be part of slot group 412, as defined, without violating the maximum price-per-click submitted by advertiser B. In some implementations, the bid restriction of advertiser B can be satisfied by reducing advertiser B's budget so that the resulting group ratio and, in turn, price-per-click, for slot group 412 are equal to $0.75. In this example, a group ratio and corresponding price-per-click equal to $0.75 can be achieved by reducing advertiser B's budget to $36.25 (e.g., $36.25+20/50+25=$0.75). Therefore, in some implementations, the scheduling subsystem 130 can reduce advertiser B's budget to $36.25 and set the group price-per-click to $0.75. At a price of $0.75, the 75 clicks for slots 2 and 3 can be allocated between advertiser A and advertiser B in proportion to their respective budgets. For example, 75(36.25/56.25) (e.g., 75*29/45) clicks and 75(20/56.25) (e.g., 75*16/45) clicks are allocated, respectively. The scheduling subsystem 130 can schedule advertiser A and advertiser B between slots 404 and 406 over time period T so that the advertisers realize the maximum possible click counts.

In some implementations, the scheduling subsystem 130 can determine the slot scheduling based on a machine scheduling routine (e.g., Q|pmtn|Cmax). The scheduling subsystem 130 can schedule the advertisers to the slots for defined allocation blocks of time period T. The allocation blocks can correspond, for example, to the portion of time that the advertiser is scheduled to appear in each slot of the slot group. Continuing with the example above, the scheduling subsystem 130 can allocate advertiser B to slot 404 for the first 29/45 of time period T, while allocating advertiser C to slot 404 for the last 16/45 of time period T. This results in advertiser A's advertisements appearing in slot 404 only during the first 29/45 of time period T. In some implementations, the scheduling can be performed by allocating advertiser B and advertiser C to slot 404 according to a coin flip that has a 29/45 probability of advertiser B winning the coin flip and a 16/45 probability of advertiser C winning the coin flip. Scheduling the advertisers in this manner allows the advertisers to share the slots throughout the time period T, rather than allocating continuous portions of the time period T to the advertisers.

Since slot groups 410 and 412 have been defined with slots 402, 404, and 406, and occupied by advertisers A-C, advertiser D will remain solely allocated to the dummy slot 408 and will receive zero clicks.

§3.0 Example Process Flows

Figure 5:
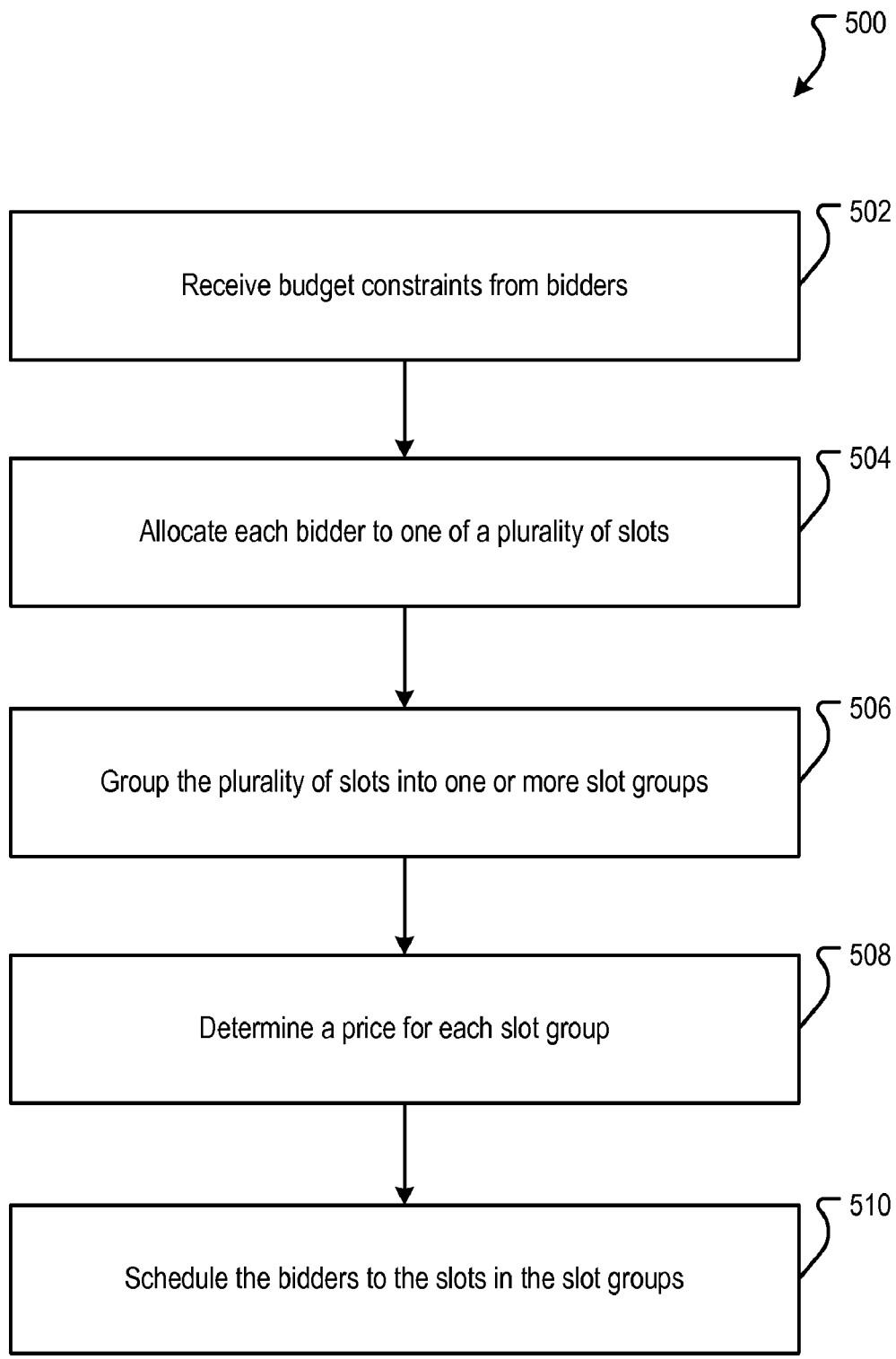
FIG. 5 is a flow chart of an example process of scheduling content items in advertisement slots.

FIG. 5 is a flow chart of an example process 500 of scheduling content items in advertisement slots. The process 500 can, for example, be used in the advertisement management system 104 and/or the scheduling subsystem 130 of FIG. 1.

Stage 502 receives a budget constraint from a plurality of bidders. In some implementations, the budget constraint can define a maximum budget that each bidder allocates for a defined period of time. For example, an advertiser 102 may submit or select to budget a maximum of $100 to be spent each day. Accordingly, the advertiser 102 will not be charged more than $100 each day for advertising. The budget constraints can be received, for example, by the advertisement management system 104 from an advertiser 102.

Stage 504 allocates each bidder to one of a plurality of slots. In some implementations, each bidder can be allocated to a slot based on a respective budget constraint. For example, advertisers that have submitted a higher budget constraint can be allocated to slots before advertisers associated with a lower budget constraint. The bidders can be allocated to a slot, for example, by the advertisement management system 104 and/or the scheduling subsystem 130 of FIG. 1.

Stage 506 groups the plurality of slots into one or more slot groups. In some implementations, at least two of the plurality of slots are considered to define at least one slot group. For example, group ratios can be used to identify advertisers and slots that can be grouped together as a slot group. In some implementations, advertisers that were initially allocated to a slot that is part of a slot group can share the slots in the slot groups with the advertisers that were initially allocated to the other slots in the slot group. The slots can be grouped, for example, by the scheduling subsystem 130 of FIG. 1.

Stage 508 determines a price for each slot group. In some implementations, the price can be based on the budget constraints that correspond to the bidders that were initially allocated to slots in the slot group. The price can be, for example, a price-per-click that each advertiser will pay for clicks received in any slot in the slot group. The price can be determined, for example, by the scheduling subsystem 130.

Stage 510 schedules the bidders to the slots in the slot groups. In some implementations, the bidders can be scheduled to the slots based on their corresponding budget constraints. For example, advertisers can be scheduled to slots so that the advertiser's entire budget is spent during the defined time period. Advertisers can be scheduled to slots, for example, by the scheduling subsystem 130.

Figure 6:
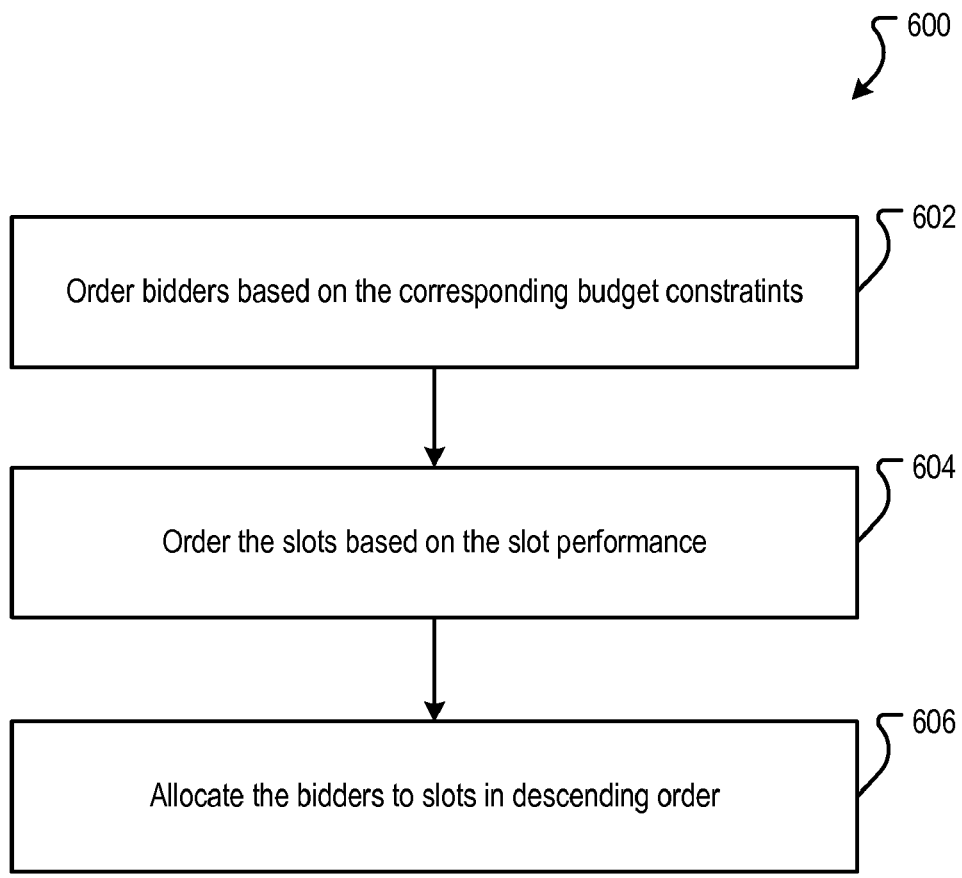
FIG. 6 is a flow chart of an example process of allocating each bidder to one of a plurality of slots.

FIG. 6 is a flow chart of an example process 600 of allocating each bidder to one of a plurality of slots. The example process 600 can, for example, be used in the advertisement management system 104 and/or the scheduling subsystem 130 of FIG. 1.

Stage 602 orders bidders based on corresponding budget constraints. In some implementations, the bidders are ordered in descending order of the budget constraints. For example, advertisers A-C can have corresponding budget constraints of $10, $50, and $25, respectively, such that the order of the advertisers is B, A, C. The advertisers can be ordered, for example, by the advertisement management system 104 and/or the scheduling subsystem 130 of FIG. 1.

Stage 604 orders the slots based on the slot performance. In some implementations, the slots can be ordered in descending order of slot performance. The slot performance can be, for example, a click count associated with the slot over a defined time period. For example, online advertisement slots 1-3 may have click counts of 100, 1000, and 5000 respectively over a defined time period T. Therefore, the order of the slots can be 3, 2, 1. The slots can be ordered, for example, by the advertisement management system 104 and/or the scheduling subsystem 130 of FIG. 1.

Stage 606 allocates the bidders to slots in descending order. For example, advertiser B can be allocated to slot 3, advertiser A can be allocated to slot 2, and advertiser C can be allocated to slot 1. The allocation can be performed, for example, by the advertisement management system 104 and/or the scheduling subsystem 130 of FIG. 1.

Figure 7:
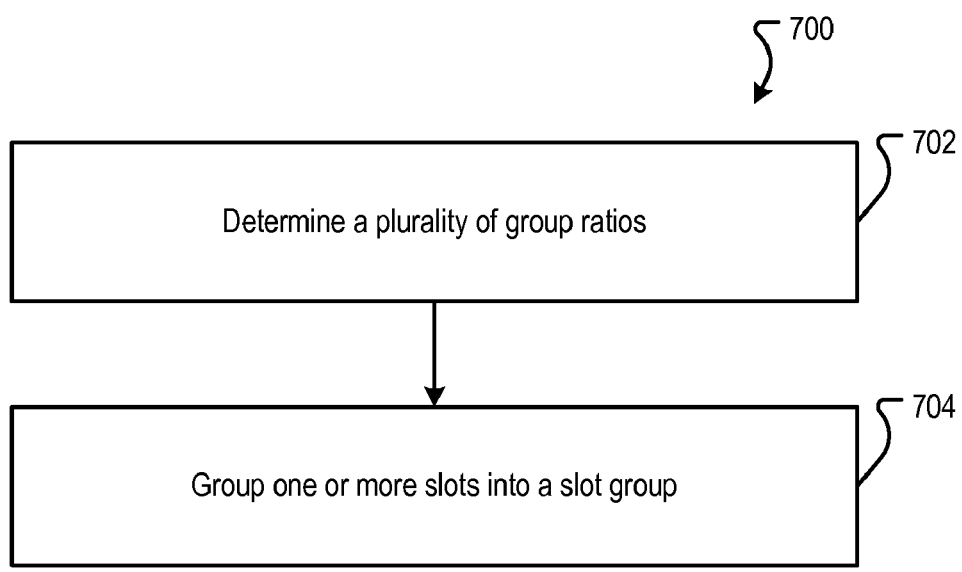
FIG. 7 is a flow chart of an example process of grouping the plurality of slots into one or more slot groups.

FIG. 7 is a flow chart of an example process 700 of grouping the plurality of slots into one or more slot groups. The process 700 can, for example, be used in the advertisement management system 104 and/or the scheduling subsystem 130 of FIG. 1.

Stage 702 determines a plurality of group ratios. In some implementations, each group ratio can be the ratio of the sum of the budget constraints associated with the bidders that were originally allocated to the slots and the cumulative slot performance corresponding to the slots in the slot group. The group ratios can be determined for example for each possible grouping of slots. For example, a group ratio can be determined for a first slot based on the budget constraint that corresponds to a first bidder and the slot performance of the first slot. Additional group ratios can be determined for each subsequent slot based on the budget constraints that correspond to each of the first bidder, a bidder associated with the subsequent slot, and bidders associated with the intervening slots. The additional group ratios can also be based on the slot performances of the first slot, the subsequent slot and the intervening slots. The plurality of group ratios can be determined, for example, by the scheduling subsystem 130.

Stage 704 groups one or more slots into a slot group. In some implementations, the slots associated with the highest group ratio are grouped into a slot group. The slots associated with the highest group ratio can be determined for example, by identifying the slots that correspond to the highest group ratio and defining the slot group to include the slots that correspond to the highest group ratio. The slots can be grouped, for example, by the scheduling subsystem 130.

Figure 8:
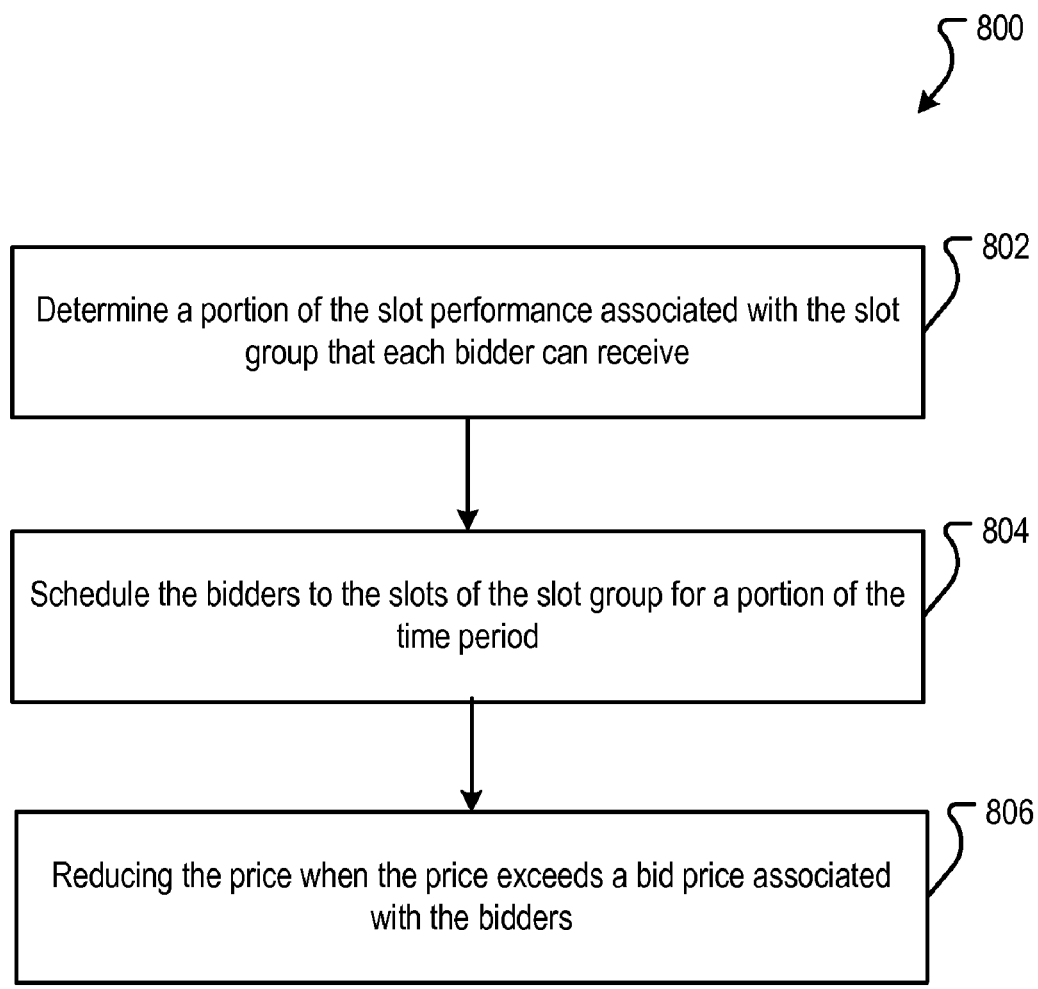
FIG. 8 is a flow chart of an example process of scheduling the bidders to the slots in the slot groups.

FIG. 8 is a flow chart of an example process 800 of scheduling the bidders to the slots in the slot groups. The process 800 can, for example, be used in the advertisement management system 104 and/or the scheduling subsystem 130 of FIG. 1.

Stage 802 determines a portion of the slot performance associated with the slot group that each bidder can receive. In some implementations, the portion of the slots performance that a bidder can receive can be determined based on the budget constraint and the price. For example, if an advertiser has a budget constraint of $50 and a price-per-click of $1 has been assigned to the slot group, then the advertiser can receive 50 clicks without exceeding the budget. Accordingly, if there are 150 clicks available in the group, then the advertiser can receive 1/3 of the total available clicks. The portion allocated to each advertiser can be similarly determined. The portion of the slot performance that each advertiser can receive can be determined, for example, by the scheduling subsystem 130.

Stage 804 schedules the bidders to the slots of the slot group for a portion of the time period. In some implementations, the bidders can be scheduled to the slots based on the portion of the slot performance that the bidder can receive over time period T. For example, an advertiser can be scheduled between the slots of the slot group so that each advertiser receives the maximum clicks that it can receive over the time period T, without exceeding its corresponding budget constraint. The scheduling can be performed, for example, according to a machine scheduling routine (e.g., $Q|pmtn|C_{max}$) that can be performed by the scheduling subsystem 130 of FIG. 1.

Figure 9:
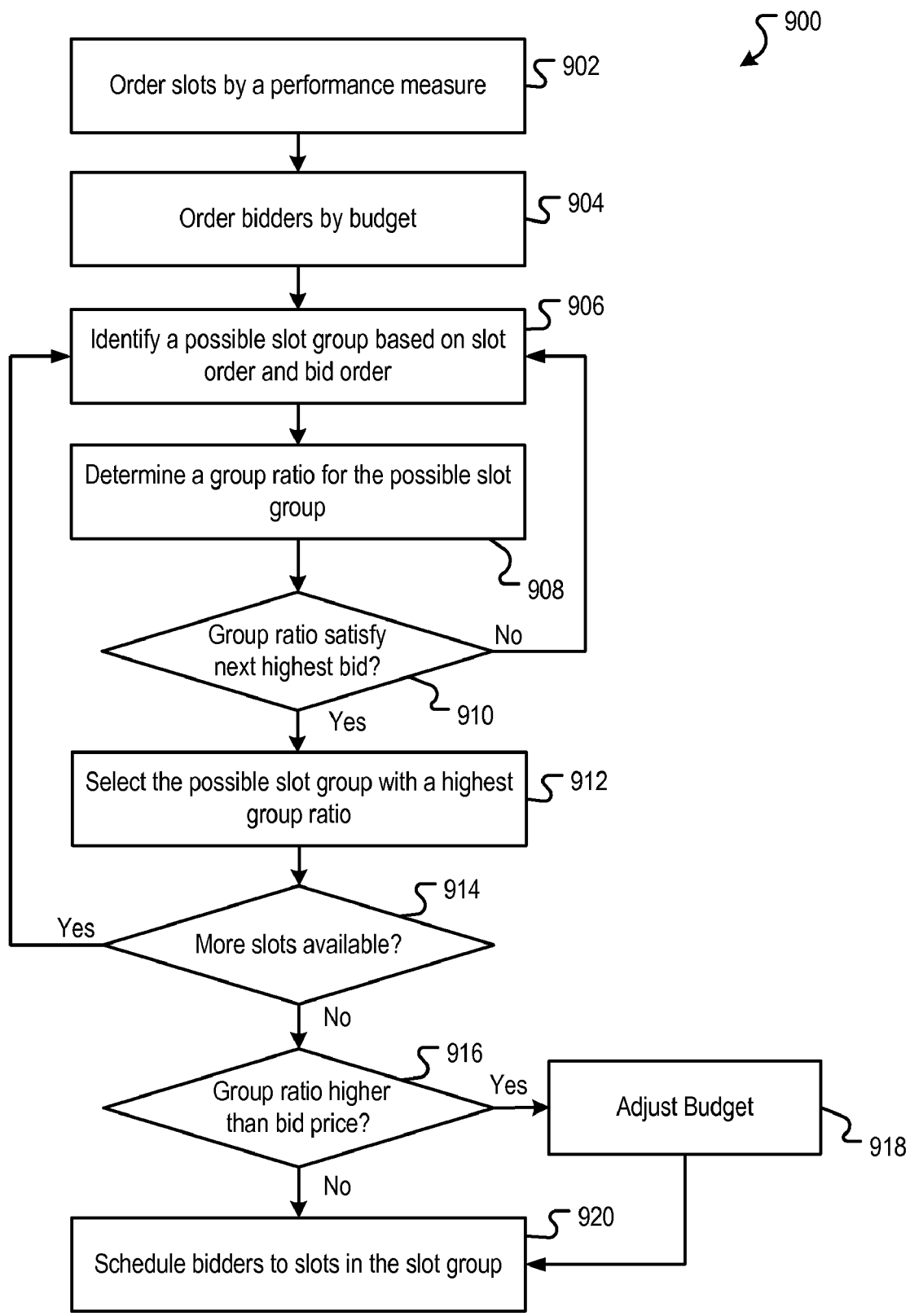
FIG. 9 is a flow chart of an example process of scheduling content items in advertisement slots.

FIG. 9 is a flow chart of an example process 900 of scheduling content items in advertisement slots. The example process 900 can, for example, be used in the advertisement management system 104 and/or the scheduling subsystem 130 of FIG. 1.

Stage 902 orders slots by a performance measure. In some implementations, the slots can be ordered, based on a click performance. The click performance can be determined, for example, based on historical click performance of the slot. In some implementations, the slots can be ordered in descending order according to the click performance. The slots can be ordered, for example, by the scheduling subsystem 130.

Stage 904 orders bidders by budgets. In some implementations, a bidder can be an advertiser that submits a maximum price that the advertiser will pay for advertisements over a defined time period. The bidders can be ordered, for example, in descending order according to budgets. The bidders can be ordered by budget, for example, by the scheduling subsystem 130.

Stage 906 identifies a possible slot group based on slot order and bid order. In some implementations, the possible slot group can include slots that occupy a higher position in the slot group order. For example, a first possible slot group can include the slot occupying the first position in the slot order. Similarly, a second possible group can include the two slots occupying the first and second position in the slot order. Other possible slot groups can be similarly defined. The possible slot group can be identified, for example, by the scheduling subsystem 130.

In some implementations, bidders can be considered for inclusion in the possible slot group based on bids. For example, the highest bidder can be considered for inclusion in the first possible slot group. Similarly, the two highest bidders can be considered for inclusion in the second possible slot group. Additional bidders can similarly be considered for inclusion in other possible slot groups in descending order of bid. The bidders can be considered for inclusion in the possible slot groups, for example, by the scheduling subsystem 130.

Stage 908 determines a group ratio for the possible slot group. In some implementations, the group ratio is a ratio of a cumulative budget relative to a cumulative slot performance. For example, the group ratio for the first possible slot group can be the budget of the bidder included in the first possible slot group, divided by the slot performance of the slot included in the first possible slot group (e.g., B1/D1). Similarly, the group ratio for the second possible slot group can be the cumulative budgets of the bidders included in the second possible slot group divided by the cumulative slot performance of the two slots included in the second possible slot group (e.g., B1+B2/D1+D2). The group ratio can be determined, for example, by the scheduling subsystem 130.

Stage 910 determines whether the group ratio for the possible slot group satisfies a next highest bid. In some implementations, if the group ratio does not meet or exceed the next highest bid, the process returns to stage 906 to identify another possible slot group. For example, the group ratio of the first possible slot group can be compared to the bid associated with the second highest bidder. If the group ratio of the first possible slot group does not meet or exceed the second highest bid, the process can return to stage 906 to identify the second possible slot group. In turn, the group ratio of the second possible slot group (e.g., containing the two slots with the highest slot performance measures and the two highest bidders) can be compared against the third highest bid. If the group ratio of the second possible slot group meets or exceeds the third highest bid, the process 900 continues to stage 912. The determination of whether the group ratio satisfies the next highest bid can be performed, for example, by the scheduling subsystem 130.

Stage 912 selects the possible slot group with the highest group ratio. In some implementations, the selected possible slot group can define a slot group. For example, if the first possible slot group has a group ratio of 0.667 and the second possible slot group has a group ratio of 0.80, then the second possible slot group can be selected. In turn, the second possible slot group can define a first slot group. The possible slot group with the highest group ratio can be selected, for example, by the scheduling subsystem 130.

Stage 914 determines whether more slots are available for grouping. In some implementations, more slots are available for grouping because not all slots have been included in a slot group. If more slots are available for grouping the process 900 can return to stage 906 and process remaining slots. However, if all of the slots have been included in a slot group, the process 900 can continue to stage 916. The determination of whether more slots are available for grouping can be performed, for example, by the scheduling subsystem 130.

Stage 916 determines whether the group ratio associated with each group is higher than the bids for the bidders included in the slot group. This determination can be performed, for example, by comparing the group ratio for each group to the bids for the bidders included in each group. In some implementations, if the group ratio is higher than the bid of a bidder included in the slot group, the process 900 can continue to stage 918. However, if the group ratio is not higher than any of the bids for the bidders included in the slot group, the process 900 can continue to stage 920. The determination of whether the group ratio is higher than the bids for the bidders in the slot group can be performed, for example, by the scheduling subsystem 130.

Stage 918 adjusts a budget of a bidder in the slot group. In some implementations, the budget of the bidder associated with the bid that is lower than the group ratio can be adjusted. The bidder's budget can be reduced, for example, until a resulting group ratio for the slot group is equal to the bidder's bid. For example, if the group ratio of the first slot group is $0.80 and a bidder included in the first slot group has a bid of $0.75, that bidder's budget can be reduced until the group ratio (e.g., B1+B2/D1+D2) is equal to $0.75. The bids can be adjusted, for example, by the scheduling subsystem 130.

Stage 920 schedules the bidders to slots in the slot group. In some implementations, the bidders can be scheduled to the slots based on the portion of the slot performance that the bidder can receive over a defined time period. The bidders can be scheduled to slots, for example, by the scheduling subsystem 130.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
receiving a budget constraint from a plurality of bidders, wherein each budget constraint defines a maximum budget that each bidder allocates for a defined time period;
assigning each bidder to one of a plurality of slots for a same web page, the slot to which each bidder is assigned being based on the budget constraint for the bidder;
grouping, by one or more computers, the plurality of slots for the same web page into two or more different slot groups for the same web page, wherein at least two of the plurality of slots are grouped to a same slot group;
determining, by one or more computers, a price for the same slot group based on a function of the budget constraints for the bidders that were assigned to the slots in the same slot group and a slot performance associated with the slots in the same slot group;
scheduling, by one or more computers, the bidders to the slots in the same slot group during the defined time period based, at least in part, on the price for the same slot group, wherein:
the at least two of the plurality of slots comprise two slots for which the slot performance is higher than the slot performance for others of the plurality of slots; and
the price for the same slot group is a same price that is charged for presentation of an advertisement in any of the slots that were grouped to the same slot group independent of which of the advertisers is presenting an advertisement in the slot.

2. The method of claim 1, wherein:
the bidders are online advertisers.

3. The method of claim 1, wherein assigning each bidder to one of a plurality of slots comprises:

ordering the bidders based on a corresponding budget constraint;
ordering the slots based on the slot performance; and
allocating the bidders to slots in descending order.

4. The method of claim 1 wherein grouping the plurality of slots into two or more different slot groups comprises:
determining a plurality of group ratios; and
grouping one or more slots into a slot group based on the group ratios.

5. The method of claim 4, wherein:
determining a group ratio for a first slot based on the budget constraint that corresponds to a first bidder and the slot performance of the first slot;
determining the group ratio for each subsequent slot based on the budget constraints that correspond to each of the first bidder, a bidder associated with the subsequent slot, and bidders associated with intervening slots, the group ratio for each subsequent slot being further based on the slot performances of the first slot, the subsequent slot, and the intervening slots between the first slot and the subsequent slot; and
grouping one or more slots into the slot group based on the group ratios comprises:
identifying the slot that corresponds to a highest group ratio; and
grouping the identified slot and one or more of ungrouped slots having higher slot performance than the identified slot.

6. A computer-implemented method comprising:
receiving a budget constraint from a plurality of bidders, wherein each budget constraint defines a maximum budget that each bidder allocates for a defined time period;
allocating each bidder to one of a plurality of slots on a same web page, the allocation being based on a respective budget constraint;
determining a first group ratio for a first possible slot group that includes only a first slot having a highest slot performance among the plurality of slots, the first group ratio being determined based on the budget constraint that corresponds to a first bidder that was assigned to the first slot and the slot performance of the first slot;
determining a second group ratio for a second possible slot group that includes the first slot and a second slot that has a second highest slot performance among the plurality of slots, the second group ratio being based on the budget constraints for each of the first bidder and a second bidder that was assigned to the second slot and the slot performance for each of the first slot and the second slot;
determining that the second group ratio is higher than the first group ratio;
selecting the second possible group as a slot group for the same web page in response to determining that the second group ratio is higher than the first group ratio;
determining, by one or more computers, a price for each slot group based on the budget constraints that correspond to the bidders in the slot group and a slot performance associated with the slots in the slot group, the price being charged for each slot in the slot group; and
scheduling, by one or more computers, the bidders to the slots in the slot groups during the defined time period based on the price for each slot group.

7. The method of claim 6, wherein determining a price for each slot group comprises assigning the group ratio for the second possible slot group as the price for the slot group for the same web page.

8. The method of claim 7, wherein scheduling the bidders to the slots in the slot groups comprises:
determining a portion of the slot performance associated with the slot group that each bidder can receive without exceeding the corresponding budget constraint; and
scheduling the bidders to the slots of the slot group for a portion of the time period based on the determined portion of the slot performance that each bidder can receive.

9. The method of claim 8, further comprising reducing the price when the price exceeds a bid price associated with the bidders.

10. The method of claim 9, wherein reducing the price comprises reducing a lowest budget constraint corresponding to a bidder associated with the slot group until the price satisfies the bid price.

11. A computer-implemented slot scheduling system comprising:
a scheduling subsystem including one or more computers that are operative to:
receive a budget constraint from a plurality of bidders, wherein each budget constraint defines a maximum budget that each bidder allocates for a defined time period;
assign each bidder to one of a plurality of slots for a same web page, the slot to which each bidder is assigned being based on the budget constraint for the bidder;
group the plurality of slots for the same web page into two or more different slot groups for the same web page, wherein at least two of the plurality of slots are grouped to a same slot group;
determine a price for the same slot group based on a function of the budget constraints for the bidders that were assigned to the slots in the same slot group and a slot performance associated with the slots in the same slot group;
schedule the bidders to the slots in the same slot group during the defined time period, a portion of the defined time period for which each of the bidders is scheduled to the slots in the same slot group being based, at least in part, on the price for the same slot group, wherein:
the at least two of the plurality of slots comprise two slots for which the slot performance is higher than the slot performance for others of the plurality of slots; and
the price for the same slot group is a same price that is charged for presentation of an advertisement in any of the slots that were grouped to the same slot group independent of which of the advertisers is presenting an advertisement in the slot.

12. The system of claim 11, wherein the bidders are online advertisers.

13. The system of claim 11, wherein the scheduling subsystem assigns each bidder to one of a plurality of slots by performing operations including:
ordering the bidders based on a corresponding budget constraint;
ordering the slots based on the slot performance; and
assigning the bidders to slots in descending order.

14. The system of claim 11, wherein the scheduling subsystem groups the plurality of slots into two or more different slot groups by performing operations including:
determining a plurality of group ratios; and
grouping one or more slots into a slot group based on the group ratios.

15. The system of claim 14, wherein:
the scheduling subsystem determines the plurality of group ratio by performing operations including:

determining the group ratio for a first slot based on the budget constraint that corresponds to a first bidder and the slot performance of the first slot; and determining the group ratio for each subsequent slot based on the budget constraints that correspond to each of the first bidder, a bidder associated with the subsequent slot, and bidders associated with intervening slots, the group ratio for each subsequent slot being further based on the slot performances of the first slot, the subsequent slot, and intervening slots between the first slot and the subsequent slot; and the scheduling subsystem groups one or more slots into the slot group based on the group ratios by performing operations including:

identifying the slot that corresponds to a highest group ratio; and grouping the identified slot and one or more of ungrouped slots having higher slot performance than the first slot than the identified slot.

16. A computer-implemented slot scheduling system comprising:

a scheduling subsystem including one or more processors, the scheduling subsystem being operative to:

receive a budget constraint from a plurality of bidders, wherein each budget constraint defines a maximum budget that each bidder allocates for a defined time period;

allocate each bidder to one of a plurality of slots on a same web page, the allocation being based on a respective budget constraint;

determine a first group ratio for a first possible slot group that includes only a first slot having a highest slot performance among ungrouped slots in the plurality of slots, the first group ratio being determined based on the budget constraint that corresponds to a first bidder that was assigned to the first slot and the slot performance of the first slot;

determine a second group ratio for a second possible slot group that includes the first slot and a second slot that has a second highest slot performance among the plurality of slots, the second group ratio being based on the budget constraints for each of the first bidder and a second bidder that was assigned to the second slot and the slot performance for each of the first slot and the second slot;

determine that the second group ratio is higher than the first group ratio;

select the second possible group as a slot group for the same web page in response to determining that the second group ratio is higher than the first group ratio;

determine a price for each slot group based on the budget constraints that correspond to the bidders in the slot group and a slot performance associated with the slots in the slot group, the price being charged for each slot in the slot group; and schedule the bidders to the slots in a corresponding slot group over the defined time period based on the price.

17. The system of claim 16, wherein the scheduling subsystem determines the price for each slot group by performing operations including assigning the highest group ratio as the price for the slot group.

18. The system of claim 17, wherein the scheduling subsystem schedules the bidders to the slots in a corresponding slot group by performing operations including:

determining a portion of the slot performance associated with the slot group that each bidder can receive without exceeding the corresponding budget constraint; and scheduling each bidder to the slots in the corresponding slot group for a portion of the time period based on the slot performance that each bidder can receive.

19. The system of claim 18, wherein the scheduling subsystem reduces the price when the price exceeds a bid price associated with the bidders.

20. The system of claim 19, wherein the scheduling subsystem reduces the price including reducing a lowest budget constraint corresponding to a bidder in the same slot group until the price satisfies the bid price.

* * * * *

UNITED STATES PATENT AND TRADEMARK OFFICE
CERTIFICATE OF CORRECTION

PATENT NO. : 8,335,718 B2  
APPLICATION NO. : 12/197726  
DATED : December 18, 2012  
INVENTOR(S) : Jonathan E. Feldman et al.

It is certified that error appears in the above-identified patent and that said Letters Patent is hereby corrected as shown below:

Claim 15, Column 21, Line 19-20 – delete "performance than the first slot than" and insert -- performance than --, therefor.

Signed and Sealed this  
Twelfth Day of March, 2013

Teresa Stanek Rea  
*Acting Director of the United States Patent and Trademark Office*